(12) United States Patent
Fox-Rabinovitz et al.

(10) Patent No.: US 12,738,166 B2
(45) Date of Patent: Sep. 15, 2026

(54) METHODS AND SYSTEMS FOR RESCUE OF AUTONOMOUS VEHICLES

(71) Applicant: Torc Robotics, Inc., Blacksburg, VA (US)

(72) Inventors: Joseph R. Fox-Rabinovitz, Blacksburg, VA (US); Pablo Smith, Blacksburg, VA (US); William Davis, Blacksburg, VA (US); Akshay Pai Raikar, Blacksburg, VA (US); Justin Yurkanin, Blacksburg, VA (US); Christopher Harrison, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 59 days.

(21) Appl. No.: 18/393,465

(22) Filed: Dec. 21, 2023

(65) Prior Publication Data

US 2025/0209921 A1 Jun. 26, 2025

(51) Int. Cl.

*G08G 1/00* (2006.01)
*B60W 60/00* (2020.01)
*G07C 5/00* (2006.01)

(52) U.S. Cl.

CPC ........... *G08G 1/205* (2013.01); *B60W 60/001* (2020.02); *G07C 5/008* (2013.01)

(58) Field of Classification Search

CPC ...... G08G 1/205; B60W 60/001; G07C 5/008
USPC .......................................................... 340/988
See application file for complete search history.

(56) References Cited

U.S. PATENT DOCUMENTS

| | | | | |
|---|---|---|---|---|
| 6,330,499 | B1 * | 12/2001 | Chou | G07C 5/08 701/32.7 |
| 6,339,736 | B1 * | 1/2002 | Moskowitz | G06Q 20/203 705/413 |
| 6,728,612 | B1 * | 4/2004 | Carver | H04L 43/50 701/34.3 |
| 9,905,133 | B1 * | 2/2018 | Kumar | G08G 1/202 |
| 10,386,835 | B2 | 8/2019 | Vogt et al. | |
| 11,062,416 | B1 * | 7/2021 | Jang | B60W 60/00256 |
| 11,079,754 | B2 | 8/2021 | Patel et al. | |
| 11,107,358 | B1 * | 8/2021 | Lyle | G05D 1/0027 |
| 11,219,034 | B1 * | 1/2022 | Dunsmore | H04W 72/542 |
| 11,436,874 | B2 * | 9/2022 | Yang | G07C 5/008 |

(Continued)

*Primary Examiner* — Brian A Zimmerman
*Assistant Examiner* — Thang D Tran
(74) *Attorney, Agent, or Firm* — Armstrong Teasdale LLP

(57) ABSTRACT

A computer-implemented method is disclosed. The method includes receiving, at an application server from an autonomous vehicle, telematics data, and based upon analysis of the received telematics data, determining, by the application server, that the autonomous vehicle needs to be rescued. The method includes verifying, by the application server, a health status of a communication connection with the autonomous vehicle. The method includes based upon the health status of the communication connection with the autonomous vehicle, performing, by the application server, a plurality of checks to identify one or more problems with a plurality of modules of the autonomous vehicle, and based upon the plurality of checks indicating no failure corresponding to the plurality of modules of the autonomous vehicle, dispatching a service vehicle to a location of the autonomous vehicle to rescue the autonomous vehicle.

14 Claims, 7 Drawing Sheets

(56) References Cited

U.S. PATENT DOCUMENTS 11,475,721 B2* 10/2022 Liu ..................... G07C 5/0841
11,587,370 B2* 2/2023 Zeira .................... G07C 5/0808
11,868,140 B2* 1/2024 Abari ................... G06Q 10/063
12,056,965 B1* 8/2024 Marlow ................. G06V 20/56
12,277,811 B1* 4/2025 Herron .................. G07C 5/008
2008/0082221 A1* 4/2008 Nagy .................. G07C 5/0808 701/2
2009/0254240 A1* 10/2009 Olsen, III .............. G07C 5/008 701/29.5
2013/0204484 A1* 8/2013 Ricci ...................... G06F 17/00 701/29.6
2014/0195098 A1* 7/2014 Lorenz ................. G07C 5/0808 701/29.3
2015/0127570 A1* 5/2015 Doughty .............. G06Q 50/265 705/325
2017/0092020 A1* 3/2017 Hathaway ............ G07C 5/0808
2017/0309086 A1* 10/2017 Zhai ..................... A61B 5/0013
2018/0365913 A1* 12/2018 Nix ....................... B60K 35/28
2019/0318549 A1* 10/2019 Zeira ..................... G07C 5/006
2019/0374889 A1* 12/2019 Vaidya ................. G05D 1/0088
2020/0050190 A1* 2/2020 Patel .................... G05D 1/0276
2020/0084176 A1* 3/2020 Wolf ................... B61L 15/0027
2020/0143295 A1* 5/2020 Sakurada .......... B60W 60/0025
2021/0074152 A1* 3/2021 Floyd ................... G08G 1/0965
2021/0122385 A1* 4/2021 Rovira de la Torre ...................... B60R 16/0315
2021/0181760 A1* 6/2021 Lee ...................... G05D 1/0072
2021/0197702 A1* 7/2021 Krishnamurthi ..... G07C 5/0808
2021/0300417 A1* 9/2021 Sarkar ............... B60W 30/0956
2022/0067667 A1* 3/2022 Mahipal ................. G06N 3/006
2022/0084412 A1* 3/2022 Urano ............... B60W 60/0021
2022/0122213 A1* 4/2022 Ortiz ...................... G06Q 50/40
2022/0126858 A1* 4/2022 Liu ..................... B60W 60/001
2022/0126862 A1* 4/2022 Xiao ................. B60W 50/0205
2022/0194414 A1* 6/2022 Yu ......................... B60W 10/08
2023/0037318 A1* 2/2023 Foster .................. G05D 1/0027
2023/0109606 A1* 4/2023 Sakai ..................... G08G 1/164 701/117
2023/0365143 A1* 11/2023 Yumer .................. B60W 30/12
2024/0010231 A1* 1/2024 Han ................. G08G 1/096791
2025/0187616 A1* 6/2025 Hagvall ........... G08G 1/096725
2025/0196787 A1* 6/2025 Ferone ................ B60R 16/0234

* cited by examiner

METHODS AND SYSTEMS FOR RESCUE OF AUTONOMOUS VEHICLES

TECHNICAL FIELD

The field of the disclosure relates generally to an autonomous vehicle and, more specifically, methods and systems for rescuing autonomous vehicles experiencing a non-mechanical failure.

BACKGROUND OF THE INVENTION

An autonomous vehicle can break down, or experience a failure, similarly to a semi-autonomous vehicle or a non-autonomous vehicle. However, since no human driver is needed for operating an autonomous vehicle, when the autonomous vehicle breaks down, human interaction is generally required to bring the autonomous vehicle back to an operational state. Like many other semi-autonomous or non-autonomous vehicles being towed to a repair facility, the autonomous vehicle can also be towed to the repair facility when a failure occurs. However, a breakdown in the autonomous vehicle may differ significantly from a breakdown in the semi-autonomous vehicle or non-autonomous vehicle. Accordingly, depending on the type of failure that caused a given breakdown in the autonomous vehicle, towing the autonomous vehicle to the repair facility is not always the best choice. Accordingly, there is a need to streamline and make the currently known options more efficient to bring the autonomous vehicle back on the road after a failure.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a computer-implemented method is disclosed. The computer-implemented method includes (i) receiving, at an application server from an autonomous vehicle, telematics data; (ii) based upon analysis of the received telematics data, determining, by the application server, that the autonomous vehicle needs to be rescued; (iii) verifying, by the application server, a health status of a communication connection with the autonomous vehicle; (iv) based upon the health status of the communication connection with the autonomous vehicle, performing, by the application server, a plurality of checks to identify one or more problems with a plurality of modules of the autonomous vehicle; and (v) based upon the plurality of checks indicating no failure corresponding to the plurality of modules of the autonomous vehicle, dispatching a service vehicle to a location of the autonomous vehicle to rescue the autonomous vehicle.

In another aspect, a computer-implemented method is disclosed. The computer-implemented method includes (i) establishing a communication link between a computing device of a service vehicle and an autonomous vehicle being rescued by attaching an electrical cable between an electrical interface of the service vehicle and an electrical interface of the autonomous vehicle; (ii) verifying, from the computing device of the service vehicle, an operational status of a power supply of the autonomous vehicle; (iii) powering the autonomous vehicle on based upon the operational status of the power supply of the autonomous vehicle; (iv) performing, by the computing device of the service vehicle, a handshake operation with the autonomous vehicle; (v) executing, by the computing device of the service vehicle, a plurality of commands based upon successfully performing the handshake operation; and (vi) initiating rescue of the autonomous vehicle using the service vehicle based upon a successful execution of the plurality of commands.

In yet another aspect, a service vehicle is disclosed. The service vehicle includes an enclosure including an assembly for steering an autonomous vehicle being rescued and an assembly for driving the autonomous vehicle being rescued. The service vehicle includes a seat for a rescue operator, an electrical interface adapted to attach an electrical cable to communicatively couple a computing device of the service vehicle with an electronic control unit (ECU) at an electrical interface of the autonomous vehicle, and a plurality of mechanical attachment points to attach the service vehicle in front of the autonomous vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
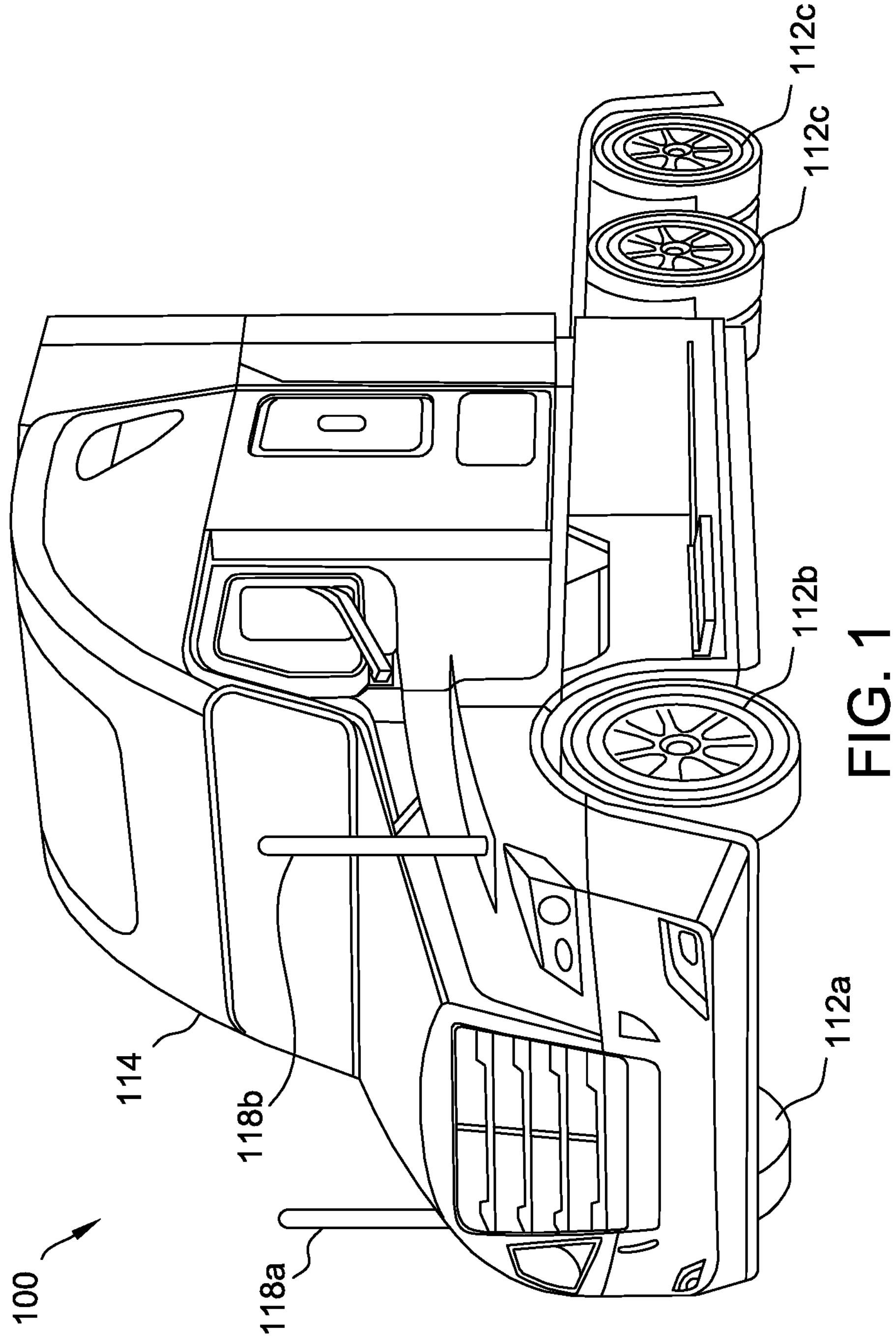
FIG. 1 is a schematic diagram of a truck having amenities in a cabin of the vehicle.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The Following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, also referenced herein as a centralized or regionalized control, is a hub in communication with one or more autonomous vehicles of a fleet. Human agents, or artificial intelligence based agents, positioned at mission control may monitor data or service requests received from the autonomous vehicle and may dispatch a rescue vehicle (also referenced herein as a service vehicle) at the autonomous vehicle's location.

As described in the present disclosure, an autonomous vehicle can experience a failure, or "break down," similarly to a semi-autonomous vehicle or a non-autonomous vehicle. However, since no human driver is needed for operating an autonomous vehicle, when the autonomous vehicle experiences a failure, human interaction is generally required to bring the autonomous vehicle back on the road. The autonomous vehicle can be towed to the repair facility when a failure occurs in the autonomous vehicle. However, not every potential failure in the autonomous vehicle requires towing. Rather, as described herein, more streamlined and efficient options may be pursued to bring the autonomous vehicle back on the road.

In some embodiments, the autonomous vehicle may be a truck or other fleet vehicle in communication with a centralized or regionalized control, or "mission control." Mission control receives telematics data of the vehicle. The telematics data may include, but is not limited to, global positioning system (GPS) or localization data, velocity and acceleration data of the vehicle, vehicle maintenance data, or sensor data related to monitoring of various electrical or mechanical components or modules. The autonomous vehicle may send the telematics data periodically to mission control. Additionally, or alternatively, mission control may request the autonomous vehicle to send the telematics data, or the autonomous vehicle may send the telematics data to mission control when analysis of the telematics data suggests an electrical component or module, or a mechanical component or module is malfunctioning or experiencing a failure. For example, the autonomous vehicle may send the telematics data to mission control when the autonomous vehicle experiencing unexpected or emergency conditions, for example, conditions requiring the autonomous vehicle to stop on or near the roadway.

In some embodiments, mission control may analyze the received telematics data and upon detecting that the autonomous vehicle is unable to proceed due to unexpected or emergency conditions, or similar issues, mission control may initiate a rescue operation to put the autonomous vehicle back in operation. Mission control may verify network communication between mission control and the autonomous vehicle. By way of a non-limiting example, mission control may transmit one or more test commands to the autonomous vehicle, and the autonomous vehicle may transmit one or more test responses to mission control to verify the network communication between mission control and the autonomous vehicle. The test commands may include, for example, a ping command or an echo command.

Upon receiving one or more test responses from the autonomous vehicle, mission control may confirm the network communication between the autonomous vehicle and mission control is intact. Upon determining that the network communication between the autonomous vehicle and mission control is intact, mission control may query current status or current telematics data of the autonomous vehicle. And if mission control determines the network communication between the autonomous vehicle and mission control is not intact, for example, because one or more test responses are not received by mission control, mission control may query the last received telematics data before the network communication failure.

Based upon querying the current status (or current telematics data) or the last received telematics data before the network communication failure, mission control may determine or identify whether there is an error in a vehicle interface. As described herein, the error in the vehicle interface may prevent sending further control commands to the autonomous commands to operate the autonomous vehicle and, upon determining the error is in the vehicle interface, a further check may be performed to determine whether the error in the vehicle interface is due to a power supply related issue, such as an alternator, power bus, fuel cell, or a battery. If it is confirmed that the error in the vehicle interface is due to the power supply related issue, or there is no error found in the vehicle interface, then a rescue team or a rescue vehicle (also referenced herein as a service vehicle) may be sent to a location determined from the received telematics data. Otherwise, a tow truck may be sent to the location of the autonomous vehicle. The location of the autonomous vehicle may be determined from the received telematics data.

In some embodiments, the rescue team or the rescue vehicle may perform additional assessments of the failure of the autonomous vehicle. The rescue vehicle may include an electrical interface to attach at an electrical interface of the autonomous vehicle provided or designed for such rescue operations. The rescue vehicle may have an analog user interface (or a mechanical user interface) including buttons, transducers, switches, etc., or a digital user interface implemented as an element of an application executing on a rescue operator's mobile phone, tablet, a laptop, or a personal computer. For example, the application may be a web-browser based application or a mobile application. Additionally, or alternatively, the rescue operator may employ a user interface of an application executing on a computing device installed or positioned in the rescue vehicle itself.

In some embodiments, employing the user interface of the application, the rescue operator may verify proper functioning of the power supply system of the autonomous vehicle. Upon determining the power supply system of the autonomous vehicle is not functioning properly, if the rescue vehicle can provide external power supply system to the autonomous vehicle, then the autonomous vehicle may be powered using the external power supply system of the rescue vehicle. Otherwise, the rescue operator may request a tow truck to tow the autonomous vehicle to the repair facility.

In some embodiments, upon determining that the power supply system of the autonomous vehicle is functioning properly or powering the autonomous vehicle using the external power supply system provided by the rescue vehicle, a handshake operation may be performed in order to check a communication path between the autonomous vehicle and the rescue vehicle. The purpose of the handshake is primarily to establish and authenticate the identity of the rescue vehicle, and give it access to the systems of the autonomous vehicle. The handshake may include data such as the transfer of information in both directions to supply vehicle ID(s), tokens, passwords, etc., as well as to verify that the rescue vehicle is attaching to the intended autonomous vehicle. The handshake procedure may also set variables of the subsequent communication, including, but not limited to, protocol version(s), data rates, software versions, encryption parameters, etc. The handshake may be bidirectional to ensure that the autonomous vehicle has not been tampered with in the interval between reporting an error and rescue. Additionally, or alternatively, the handshake operation may be performed to check that one or more commands may be transmitted using the user interface to a master control unit (MCU) of the autonomous vehicle and appropriate responses may be received from the MCU by the application.

In some embodiments, when the handshake operation is unsuccessful, the rescue operator may request a tow truck to tow the autonomous vehicle to the repair facility. Otherwise, the rescue operator may transmit commands using the user interface of the application. By way of a non-limiting example, the commands may include, but are not limited to, commands to verify proper steering of the autonomous vehicle using the user interface, proper acceleration or deceleration (braking) of the autonomous vehicle. Additionally, or alternatively, the commands may include commands to verify proper functioning of signaling lights, headlights, hazard lights, or brake release of a trailer, etc. In some embodiments, proper functioning of a compressor may also be checked using the using the user interface, for example, by releasing and holding the released brakes. In some embodiments, upon verifying that the commands are successfully performed, then the rescue of the autonomous vehicle may be performed using the rescue vehicle. Otherwise, the rescue operator may request a tow truck to tow the autonomous vehicle to the repair facility.

In some embodiments, the rescue vehicle, as described herein, may include an enclosure, for example, such as a cage or cabin, that can be mechanically and electrically attached to the autonomous vehicle. The cage may be a fully enclosed cabin made of material that is lightweight but meets safety requirements. Alternatively, the cage may be open on the sides or top of the cage. The cage may be lightweight to avoid undue mechanical stress on structural members of (a cabin of) the autonomous vehicle when the cage is mechanically attached at the mechanical attachment points positioned in the front of the autonomous vehicle.

In certain embodiments, the enclosure may include, but is not limited to, a seat for a driver (the rescue operator), a steering wheel, a steering column, an accelerator pedal, a brake pedal, controls for the headlights or signaling lights, and a climate system. The mechanical operations corresponding to the steering wheel, the accelerator pedal, the brake pedal, or controlling the headlights or signaling lights may be converted into electrical commands or electrical inputs by a rescue module positioned in the cage. The electrical commands or electrical inputs are provided to the MCU of the autonomous vehicle to operate the autonomous vehicle using the electrical interface. In other words, the autonomous vehicle is steered using the steering wheel provided in the enclosure, and the speed of the autonomous vehicle is controlled using the accelerator pedal and the brake pedal provided in the enclosure. The electrical interface may be used to exchange data and power between the enclosure and the autonomous vehicle. Accordingly, an electrical cable connecting an electrical interface of the enclosure and an electrical interface of the autonomous vehicle may include data connections and power connections. In some embodiments, and by way of a non-limiting example, functionalities provided by the steering wheel, the accelerator pedal, and the brake pedal may be replaced with steering and speed control functionalities provided using the user interface of the application executing on the rescue operator's mobile phone, tablet, a laptop, or a personal computer, or on the computing device installed or positioned in the rescue vehicle itself.

Accordingly, when the autonomous vehicle experiences a failure on the roadway, a need for the tow truck may be eliminated by performing additional assessments using a rescue vehicle (or a service vehicle) such as a rescue enclosure (or a rescue cage) that is lightweight and can be carried to the location of the breakdown using a service vehicle, such as a pick-up truck or similar vehicle. Various embodiments described herein thus make rescue of the autonomous vehicle efficient and more streamlined. Various embodiments described above are discussed in more detail below with respect to FIGS. 1-6.

FIG. 1 illustrates an autonomous vehicle 100 that may further be conventionally connected to a single or tandem trailer to transport the trailers (not shown) to a desired location. The autonomous vehicle 100 includes a cabin 114 and can be supported by, and steered in, the required direction by front wheels 112*a*, 112*b*, and rear wheels 112*c* that are partially shown in FIG. 1. Wheels 112*a*, 112*b* are positioned by a steering system that includes a steering wheel and a steering column (not shown in FIG. 1). The steering wheel and the steering column may be located in the interior of cabin 114.

The MCU of the vehicle periodically transmits telematics data via one or more antennas 118 to a mission control. As described herein, the telematics data may include, but are not limited to, global positioning system (GPS) data of the autonomous vehicle 100, speed of the autonomous vehicle 100, vehicle maintenance data corresponding to the autonomous vehicle 100, or sensor data related to monitoring of various electrical or mechanical components or modules of the autonomous vehicle 100. Additionally, or alternatively, mission control may request the autonomous vehicle 100 to send the telematics data, or the autonomous vehicle 100 may send the telematics data to mission control when analysis of the telematics data suggests an electrical component or module, or a mechanical component or module of the autonomous vehicle 100 is malfunctioning. The autonomous vehicle 100 may also send the telematics data to mission control when the autonomous vehicle 100 is stalled on a roadway, or in other words, experiences unexpected or emergency conditions, for example, conditions requiring the autonomous vehicle 100 to stop on or near the roadway.

Figure 2A:
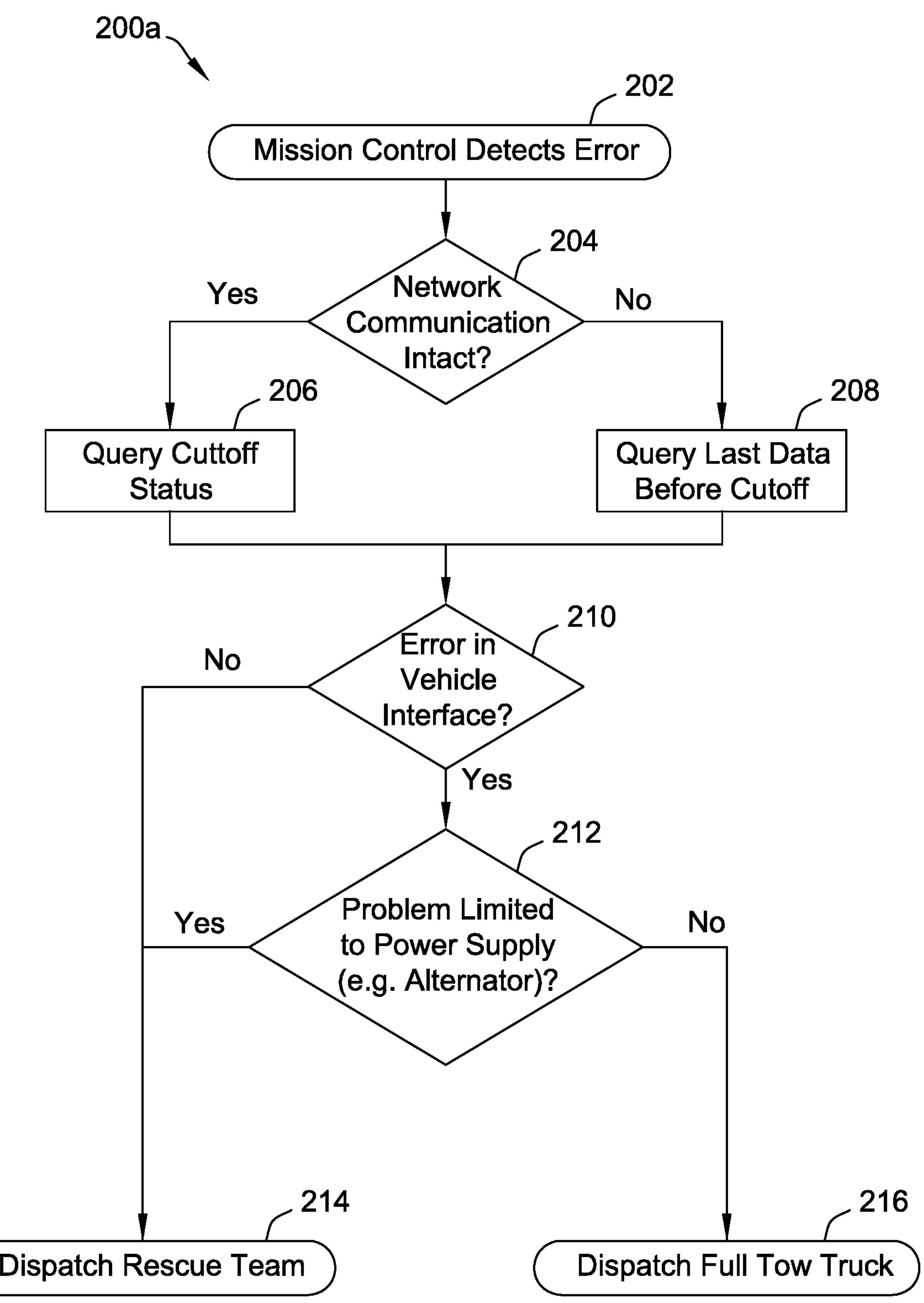
FIG. 2A is a flow-chart of an example method of determining whether a tow-truck or a rescue vehicle is required to rescue an autonomous vehicle.

FIG. 2A is a flow-chart 200*a* of an example method of determining whether a tow-truck or a rescue team (or a rescue vehicle) is required to rescue an autonomous vehicle experiencing a failure according to at least some disclosed embodiments.

In certain embodiments, mission control receives telematics data from the malfunctioning autonomous vehicle and analyzes the received telematics data. Based upon analysis of the received telematics data, mission control may detect 202 that the autonomous vehicle is stalled on the roadway (or experiences unexpected or emergency conditions, for example, conditions requiring the autonomous vehicle 100 to stop on or near the roadway), and mission control may initiate a rescue operation to put the autonomous vehicle back in operation. Mission control may verify 204 a health status of a network communication connection (or a communication connection) between mission control and the autonomous vehicle. By way of a non-limiting example, mission control may transmit one or more test commands to the autonomous vehicle, and the autonomous vehicle may transmit one or more test responses to mission control to verify the network communication connection between mission control and the autonomous vehicle. The test commands may include a ping command.

Upon receiving one or more test responses from the autonomous vehicle, mission control may identify the health status of the network communication connection between the autonomous vehicle and mission control. When the health status of the network communication connection is identified as intact (or having no issue), mission control may query current status or current telematics data 206 of the autonomous vehicle. And when the health status of the network communication connection is identified as having an issue, such as an unstable connection or no connection, based upon the one or more test responses not being received or being received late by mission control, mission control may query the last received telematics data 208 before the network communication failure. In other words, based upon the health status of the network communication connection with the autonomous vehicle, a plurality of checks may be performed to identify one or more problems with a plurality of modules of the autonomous vehicle.

Based upon querying the current status (or current telematics data) 206 or querying the last received telematics data 208 before the network communication failure, mission control may determine or identify 210 whether there is an error in a vehicle interface providing communication path between mission control and the autonomous vehicle. As described herein, the error in the vehicle interface may prevent sending further control commands to the autonomous commands to operate the autonomous vehicle, and, upon determining that the error is in the vehicle interface, a further check 212 may be performed to determine whether the error is in vehicle interface is due to a power supply related issue, such as a damaged or malfunctioning alternator, etc. If it is confirmed that the error in the vehicle interface is due to a power supply related issue, or there is no error found in the vehicle interface, then mission control may dispatch 214 a rescue team (or a rescue vehicle) may be sent at a location determined from the received telematics data. Otherwise, mission control may dispatch 216 a tow truck at the location of the autonomous vehicle.

Figure 2B:
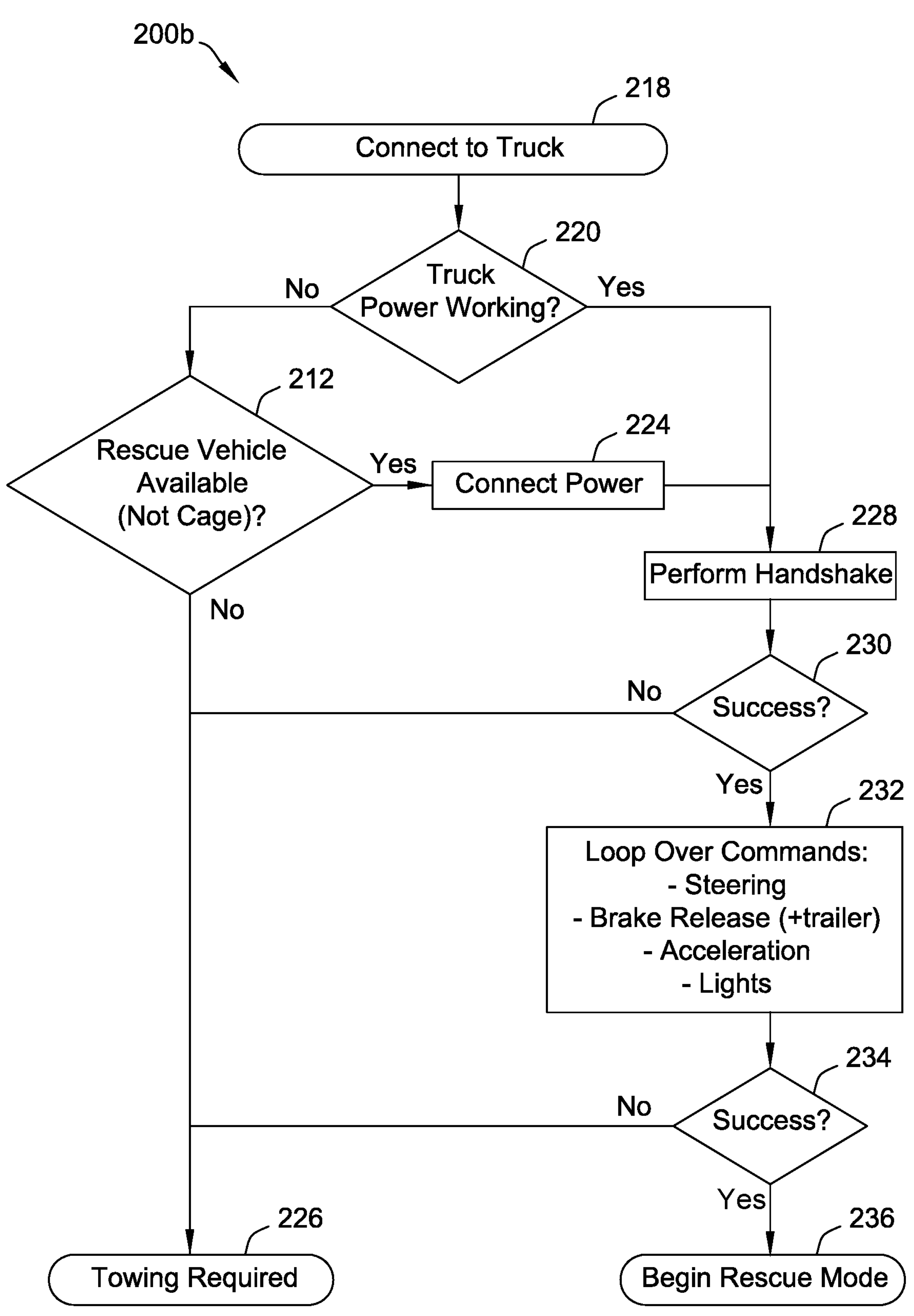
FIG. 2B is a flow-chart of another example method of assessing whether a tow-truck is required to rescue an autonomous vehicle, or if the autonomous vehicle can be rescued by the rescue vehicle.

FIG. 2B is a flow-chart 200*b* of an example method of performing assessment of whether a tow-truck is required to rescue the stalled autonomous vehicle, or the stalled autonomous vehicle can be rescued by the rescue vehicle according to some embodiments as described herein. The rescue vehicle dispatched to the location of the autonomous vehicle by mission control may perform additional assessments of the failure for the autonomous vehicle. The rescue vehicle may have an electrical interface to attach at an electrical interface of the autonomous vehicle 100 provided or designed for such rescue operations. The rescue operator may attach 218 the electrical interface of the rescue vehicle with the electrical interface of the autonomous vehicle using an electrical cable to establish a communication link between a computing device of a rescue vehicle and an autonomous vehicle being rescued. The rescue vehicle may have an analog user interface (or a mechanical user interface) including buttons, transducers, switches, etc., or a digital user interface implemented as an element of an application executing on a rescue operator's mobile phone, tablet, a laptop, or a personal computer. For example, the application may be a web-browser based application or a mobile application. Additionally, or alternatively, the rescue operator may employ a user interface of an application executing on a computing device installed or positioned in the rescue vehicle itself.

In some embodiments, using the user interface of the application, the rescue operator may verify 220 proper functioning of the electrical power supply system of the autonomous vehicle or an operational status of the power supply system of the autonomous vehicle. Upon determining that the power supply system of the autonomous vehicle is not functioning properly or the operational status of the power supply system of the autonomous vehicle suggesting a failure in the power supply system of the autonomous vehicle, the rescue operator may determine 222 if the autonomous vehicle can be powered using an external power supply system of the rescue vehicle. If it is determined that the external power supply system of the rescue vehicle can be used to provide power supply to the autonomous vehicle, then the autonomous vehicle may be powered 224 using the external power supply system of the rescue vehicle. Otherwise, the rescue operator may request 226 a tow truck to tow the autonomous vehicle to the repair facility.

In some embodiments, upon determining that the power supply system of the autonomous vehicle is functioning properly or powering the autonomous vehicle using the external power supply system of the rescue vehicle, the rescue operator may initiate 228 a handshake operation in order to establish a secure communication path between the autonomous vehicle 100 and the rescue vehicle. The handshake operation may be performed to check that one or more commands may be transmitted using the user interface to a master controller unit (MCU) or an engine control unit (ECU) of the autonomous vehicle and appropriate responses are received from the MCU or the ECU by the application. As described herein, the purpose of the handshake is primarily to establish and authenticate the identity of the rescue vehicle, and give it access to the systems of the autonomous vehicle. The handshake may include data such as the transfer of information in both directions to supply vehicle ID(s), tokens, passwords, etc., as well as to verify that the rescue vehicle is attaching to the intended autonomous vehicle. The handshake procedure may also set variables of the subsequent communication, including, but not limited to, protocol version(s), data rates, software versions, encryption parameters, etc. The handshake may be bidirectional to ensure that the autonomous vehicle has not been tampered with in the interval between reporting an error and rescue. Additionally, or alternatively, the handshake operation may be performed to check that one or more commands may be transmitted using the user interface to a master control unit (MCU) of the autonomous vehicle and appropriate responses may be received from the MCU by the application.

In some embodiments, when it is determined 230 that the handshake operation is unsuccessful, the rescue operator (or the rescue vehicle) may request 226 a tow truck to tow the autonomous vehicle to the repair facility. Otherwise, commands may be transmitted 232 to the MCU of the autonomous vehicle using the user interface of the application. By way of a non-limiting example, the commands may include, but are not limited to, commands to verify proper steering of the autonomous vehicle using the user interface, proper acceleration or deceleration (braking) of the autonomous vehicle, by commanding short movements of the autonomous vehicle. Additionally, or alternatively, the commands may include commands to verify proper functioning of signaling lights, headlights, hazard lights, or brake release of a trailer, etc. In some embodiments, proper functioning of a compressor may also be checked using the using the user interface, for example, by turning an air conditioner on and off. In some embodiments, upon verifying that the commands are successfully performed 234, the rescue of the autonomous vehicle may be performed 236 using the rescue vehicle. Otherwise, the rescue operator (or the rescue vehicle) may request 226 a tow truck to tow the autonomous vehicle to the repair facility.

Figure 3:
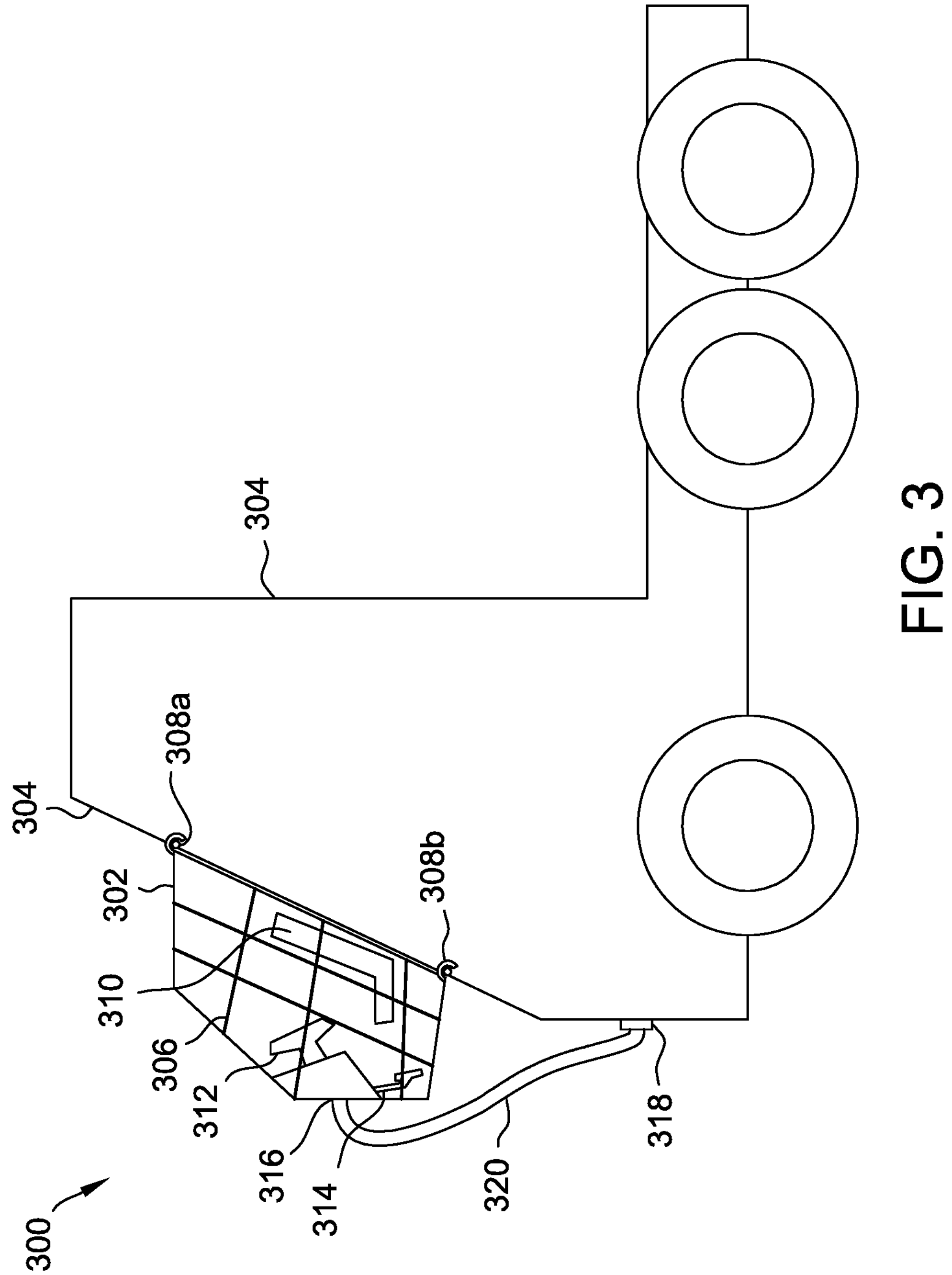
FIG. 3 is a schematics diagram of a rescue vehicle attached to an autonomous vehicle.

FIG. 3 is a schematic diagram 300 of a rescue vehicle (or rescue enclosure) 302 attached to a failed or malfunctioned autonomous vehicle 304 while rescuing the stalled autonomous vehicle 304 according to some embodiments as described herein. In some embodiments, the rescue vehicle 302, as described herein, may include a cage 306 or other enclosure that can be mechanically and electrically attached with the stalled autonomous vehicle. The cage 306 may be a fully enclosed cabin made of material that is lightweight but still meets safety requirements. Alternatively, the cage 306 may be open on the sides or top of the cage 306. The cage 306 may be lightweight such that when the cage 306 is mechanically attached at mechanical attachment points 308*a* and 308*b* positioned in the front of the autonomous vehicle 304, there is no undue mechanical stress on structural members of (a cabin of) the autonomous vehicle 304.

The cage 306 may include, but is not limited to, a seat 310 for a driver (the rescue operator), a steering wheel 312, an accelerator pedal 314, a brake pedal (not shown in FIG. 3), controls for the headlights or signaling lights (not shown in FIG. 3), and a climate system (not shown in FIG. 3). The mechanical operations corresponding to the steering wheel 312, the accelerator pedal 314, the brake pedal, or controlling the headlights or signaling lights may be converted into electrical commands or electrical inputs by a rescue module (not shown in FIG. 3) positioned in the cage 306. The accelerator pedal and the brake pedal may be referenced herein as an assembly for driving the autonomous vehicle, and the steering wheel and the steering column may be referenced herein as an assembly for steering the autonomous vehicle.

The electrical commands or electrical inputs are provided to the MCU or the ECU of the autonomous vehicle 304 to operate the autonomous vehicle 304 using the electrical interfaces 316 and 318 that are coupled together using an electrical cable 320. The autonomous vehicle 304 is steered using the steering wheel 312 provided in the cage 306, and the speed of the autonomous vehicle 304 is controlled using the accelerator pedal 314 and the brake pedal provided in the cage 306. The electrical interfaces 316 and 318 may be used for bidirectional exchange of data and power between the cage 306 and the autonomous vehicle 304. Accordingly, the electrical cable 320 connecting the electrical interface 316 of the cage 306 and the electrical interface 318 of the autonomous vehicle 304 may include data connections and power connections. In some embodiments, and by way of a non-limiting example, functionalities provided by the steering wheel 312, the accelerator pedal 314, and the brake pedal may be replaced with steering and speed control functionalities provided using the user interface of the application executing on the rescue operator's mobile phone, tablet, a laptop, or a personal computer, or on the computing device installed or positioned in the rescue vehicle itself.

Figure 4:
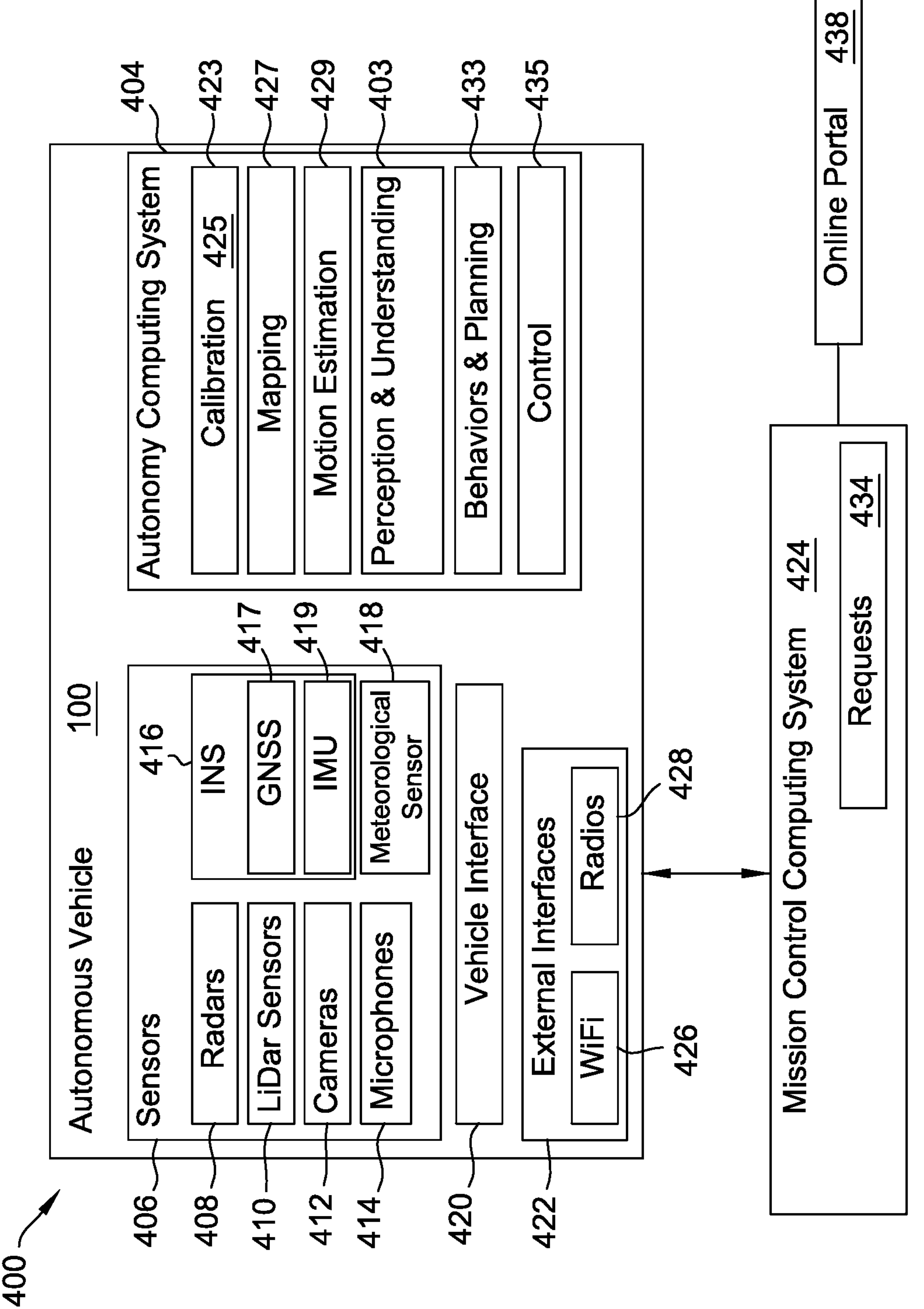
FIG. 4 is a block diagram of an example autonomous driving system.

FIG. 4 is a block diagram of an autonomous driving system 400, including an autonomous vehicle 100 (shown in FIG. 1) that is communicatively coupled with a mission control computing system 424.

Figure 6:
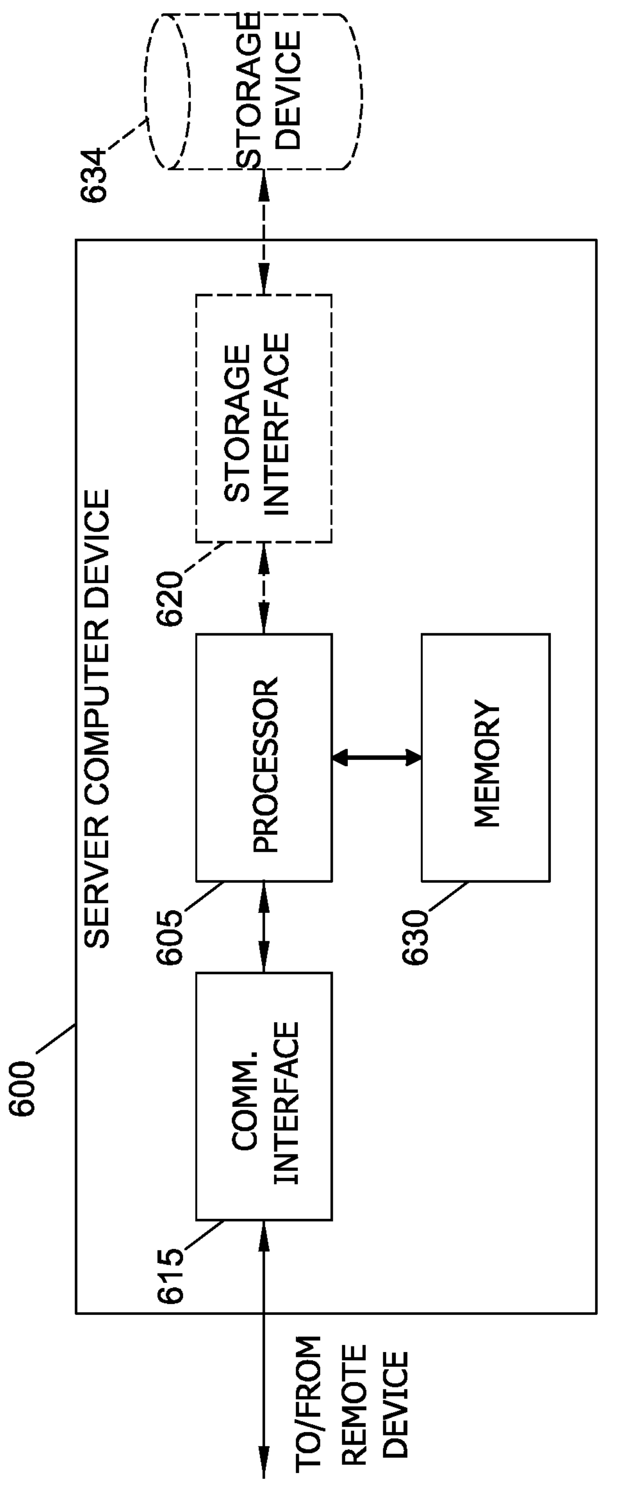
FIG. 6 is a block diagram of an example server computing device.

In some embodiments, mission control computing system 424, which is described in detail using FIG. 6, may transmit control commands or data to the autonomous vehicle 100, navigation commands, and travel trajectories to the autonomous vehicle 100, and may receive telematics data, as described herein, from the autonomous vehicle 100.

In some embodiments, the autonomous vehicle 100 may further include sensors 406. Sensors 406 may include radio detection and ranging (RADAR) devices 408, light detection and ranging (LiDAR) sensors 410, cameras 412, and acoustic sensors 414. The sensors 406 may further include an inertial navigation system (INS) 416 configured to determine states such as the location, orientation, and velocity of the autonomous vehicle 100. The INS 416 may include at least one global navigation satellite system (GNSS) receiver 417 configured to provide positioning, navigation, and timing using satellites. The INS 416 may also include an inertial measurement unit (IMU) 419 configured to measure motion properties such as the angular velocity, linear acceleration, or orientation of the autonomous vehicle 100. The sensors 406 may further include meteorological sensors 418. Meteorological sensors 418 may include a temperature sensor, a humidity sensor, an anemometer, pitot tubes, a barometer, a precipitation sensor, or a combination thereof. The meteorological sensors 418 are used to acquire meteorological data, such as the humidity, atmospheric pressure, wind, or precipitation, of the ambient environment of autonomous vehicle 100.

The autonomous vehicle 100 may further include a vehicle interface 420, which interfaces with an engine control unit (ECU) (not shown) or a MCU (not shown) of autonomous vehicle 100 to control the operation of the autonomous vehicle 100 such as acceleration and steering. The vehicle interface 420 may be an electrical interface 318 described herein to which the electric cable 320 may be attached to connect the autonomous vehicle 100 with the electrical interface 316 of the rescue vehicle 302.

The autonomous vehicle 100 may further include external interfaces 422 configured to communicate with external devices or systems such as another vehicle or mission control computing system 424. The External interfaces 422 may include Wi-Fi 426, other radios 428 such as Bluetooth, or other suitable wired or wireless transceivers such as cellular communication devices. Data detected by the sensors 406 may be transmitted to mission control computing system 424 via any of the external interfaces 422.

The autonomous vehicle 100 may further include an autonomy computing system 404. The autonomy computing system 404 may control driving of the autonomous vehicle 100 through the vehicle interface 420. The autonomy computing system 404 may operate the autonomous vehicle 100 to drive the autonomous vehicle from one location to another.

In some embodiments, the autonomy computing system 404 may include modules 423 for performing various functions. Modules 423 may include a calibration module 425, a mapping module 427, a motion estimation module 429, perception and understanding module 403, behaviors and planning module 433, and a control module 435. Modules 423 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the autonomous vehicle 100.

In some embodiments, based on the data collected from the sensors 406, the autonomy computing system 404 and, more specifically, perception and understanding module 403 senses the environment surrounding autonomous vehicle 100 by gathering and interpreting sensor data. Perception and understanding module 403 interprets the sensed environment by identifying and classifying objects or groups of objects in the environment. For example, perception and understanding module 403 in combination with various sensors 406 (e.g., LiDAR, camera, radar, etc.) of the autonomous vehicle 100 may identify one or more objects (e.g., pedestrians, vehicles, debris, etc.) and features of a roadway (e.g., lane lines) around autonomous vehicle 100, and classify the objects in the road distinctly.

In some embodiments, a method of controlling an autonomous vehicle, such as autonomous vehicle 100, includes collecting perception data representing a perceived environment of autonomous vehicle 100 using perception and understanding module 403, comparing the perception data collected with digital map data, and modifying operation of the vehicle based on an amount of difference between the perception data and the digital map data. Perception data may include sensor data from sensors 406, such as cameras 412, LiDAR sensors 410, RADAR 208, or from other components such as Motion Estimation 429 and Mapping 427.

Mapping module 427 receives perception data or raw sensor data that can be compared to one or more digital maps stored in mapping module 427 to determine where autonomous vehicle 100 is in the world or where autonomous vehicle 100 is on the digital map(s). In particular, mapping module 427 may receive perception data from perception and understanding module 403 or from the various sensors sensing the environment surrounding autonomous vehicle 100 and may correlate features of the sensed environment with details (e.g., digital representations of the features of the sensed environment) on the one or more digital maps. The digital map may have various levels of detail and can be, for example, a raster map, or a vector map. The digital maps may be stored locally on autonomous vehicle 100 or stored and accessed remotely. In at least one embodiment, autonomous vehicle 100 deploys with sufficient stored information in one or more digital map files to complete a mission without connection to an external network during the mission.

In the example embodiment, behaviors and planning module 433 and control module 435 plan and implement one or more behavior-based trajectories to operate the autonomous vehicle 100 similarly to a human driver-based operation. The behaviors and planning module 433 and control module 435 use inputs from the perception and understanding module 403 or mapping module 427 and motion estimation 429 to generate trajectories or other planned behaviors. For example, behavior and planning module 433 may generate potential trajectories or actions and select one or more of the trajectories to follow or enact by the controller 435 as the vehicle travels along the road. The trajectories may be generated based on proper (i.e., legal, customary, and safe) interaction with other static and dynamic objects in the environment. Behaviors and planning module 433 may generate local objectives (e.g., following rules or restrictions) such as, for example, lane changes, stopping at stop signs, etc. Additionally, behavior and planning module 433 may be communicatively coupled to, include, or otherwise interact with motion planners, which may generate paths or actions to achieve local objectives. Local objectives may include, for example, reaching a goal location while avoiding obstacle collisions.

In the example embodiment, based on the data collected from sensors 406, autonomy computing system 404 is configured to perform calibration, analysis, and planning, and control the operation and performance of autonomous vehicle 100. For example, autonomy computing system 404 is configured to estimate the motion of autonomous vehicle 100, calibrate parameters of the sensors, such as the extrinsic rotations of cameras, LIDAR, RADAR, and IMU, as well as intrinsic parameters, such as lens distortions, in real-time, and provide a map of surroundings of autonomous vehicle 100 or the travel routes of autonomous vehicle 100. Autonomy computing system 404 is configured to analyze the behaviors of autonomous vehicle 100 and generate and adjust the trajectory plans for the autonomous vehicle 100 based on the behaviors computed by behaviors and planning module 433.

The processed data and results (e.g., telematics data, as described herein) may be transmitted to mission control computing system 424. Mission control computing system 424 may automatically generate requests 434 based on the received telematics data. Additionally, or alternatively, the requests 434 may be placed by a user (or a mission control agent). As described herein, the requests 434 may include requests to dispatch a tow truck or a rescue vehicle to rescue the stalled autonomous vehicle 100.

In the example embodiment, the autonomous driving system 400 further includes an online portal 438. The online portal 438 may be a web-based application or an app that can be installed on a portable computing device such as a cellular phone or a tablet. The online portal 438 may be accessed for manually requesting rescue service for the stalled autonomous vehicle, monitoring progress of the rescue service operation, and receiving notification regarding the requests, and statuses, etc.

Methods described herein may be implemented at mission control computing system 424. mission control computing system 424 described herein may be a server computer device 601 and software implemented therein.

Figure 5:
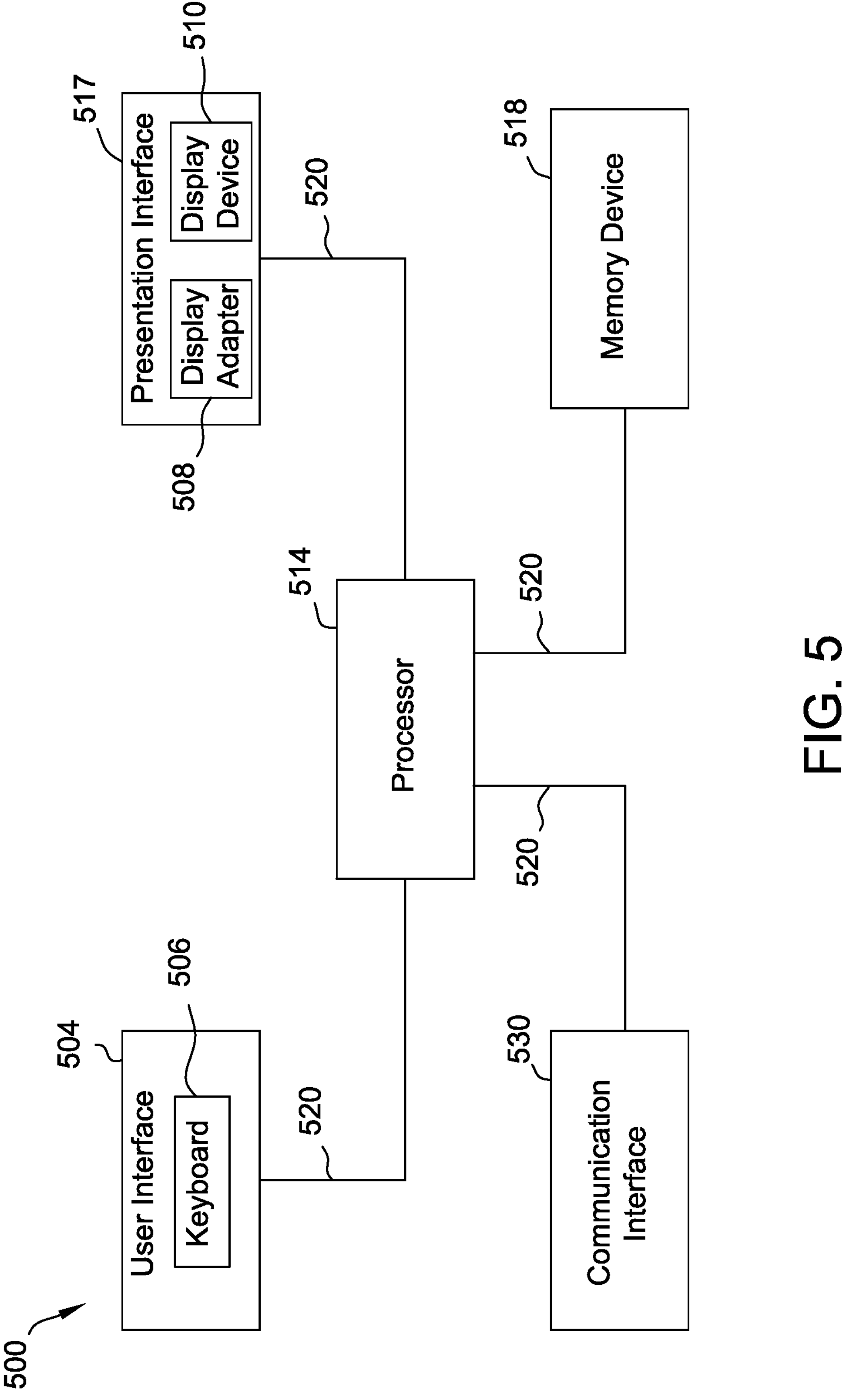
FIG. 5 is a block diagram of an example computing device.

FIG. 5 is a block diagram of an example computing device 500. Computing device 500 includes a processor 514 and a memory device 518. The processor 514 is coupled to user interface 504, presentation interface 517, and memory device 518 via a system bus 520. In the example embodiment, the processor 514 communicates with the user, such as by prompting the user via presentation interface 517 or by receiving user inputs via user interface 504. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 518 includes one or more devices that enable information, such as executable instructions or other data, to be stored and retrieved. Moreover, the memory device 518 includes one or more computer readable media, such as, without limitation, dynamic random access memory (DRAM), static random access memory (SRAM), a solid state disk, or a hard disk. In the example embodiment, the memory device 518 stores, without limitation, application source code, application object code, configuration data, additional input events, application states, assertion statements, validation results, or any other type of data. The computing device 500, in the example embodiment, may also include a communication interface 530 that is coupled to the processor 514 via system bus 520. Moreover, the communication interface 530 is communicatively coupled to data acquisition devices.

In the example embodiment, processor 514 may be programmed by encoding an operation using one or more executable instructions and providing the executable instructions in the memory device 518. In the example embodiment, the processor 514 is programmed to select a plurality of measurements that are received from data acquisition devices.

In operation, a computer executes computer-executable instructions embodied in one or more computer-executable components stored on one or more computer-readable media to implement aspects of the invention described or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In certain embodiments, the computing device 500 includes a user interface 504 that receives at least one input from a user. The user interface 504 may include a keyboard 506 that enables the user to input pertinent information. The user interface 504 may also include, for example, a pointing device, a mouse, a stylus, a touch sensitive panel (e.g., a touch pad and a touch screen), a gyroscope, an accelerometer, a position detector, or an audio input interface (e.g., including a microphone). Moreover, the computing device 500 includes a presentation interface 517 that presents information, such as input events or validation results, to the user. Presentation interface 517 may also include a display adapter 508 that is coupled to at least one display device 510. More specifically, in the example embodiment, a display device 510 may be a visual display device, such as a cathode ray tube (CRT), a liquid crystal display (LCD), a light-emitting diode (LED) display, or an "electronic ink" display. Alternatively, the presentation interface 517 may include an audio output device (e.g., an audio adapter or a speaker) or a printer.

FIG. 6 illustrates an example configuration of a server computer device 601 such as mission control computing system 424. The server computer device 601 also includes a processor 605 for executing instructions. Instructions may be stored in a memory area 630, for example. Processor 605 may include one or more processing units (e.g., in a multi-core configuration).

Processor 605 is operatively coupled to a communication interface 615 such that server computer device 601 is capable of communicating with a remote device or another server computer device 601. For example, communication interface 615 may receive data from autonomy computing system 404 or sensors 406, via the Internet or wireless communication.

Processor 605 may also be operatively coupled to a storage device 634. Storage device 634 is any computer-operated hardware suitable for storing or retrieving data. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include multiple storage units such as hard disks or solid state disks in a redundant array of independent disks (RAID) configuration. storage device 634 may include a storage area network (SAN) or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing processor 605 with access to storage device 634.

Accordingly, when the autonomous vehicle stalls on the roadway, a need for the tow truck may be eliminated, in some situations, by performing additional assessments using a rescue vehicle that is lightweight and can be carried to the location of the breakdown using a service vehicle, such as a pick-up truck or a similar vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "example embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A computer-implemented method, comprising:

receiving, at an application server from an autonomous vehicle, telematics data;

based upon analysis of the received telematics data, determining, by the application server, that the autonomous vehicle needs to be rescued;

verifying, by the application server, a health status of a communication connection with the autonomous vehicle;

based upon the health status of the communication connection with the autonomous vehicle, performing, by the application server, a plurality of checks to identify whether an error in a vehicle interface of the autonomous vehicle exists, the error in the vehicle interface preventing the autonomous vehicle from receiving control commands to operate the autonomous vehicle; and based upon the plurality of checks indicating no error in the vehicle interface, dispatching a service vehicle to a location of the autonomous vehicle to rescue the autonomous vehicle, wherein the service vehicle is configured to perform assessment of the autonomous vehicle by sending the control commands to the autonomous vehicle through the vehicle interface.

2. The computer-implemented method of claim 1, wherein verifying the health status of the communication connection with the autonomous vehicle comprises:

transmitting, from the application server to the autonomous vehicle, one or more test commands; and receiving, at the application server from the autonomous vehicle, one or more test responses corresponding to the one or more test commands.

3. The computer-implemented method of claim 2, wherein the one or more test commands include a ping command or an echo command.

4. The computer-implemented method of claim 1, wherein the method further comprises, based upon the health status of the communication connection indicating a failure in the communication connection with the autonomous vehicle, querying the telematics data received before the communication connection with the autonomous vehicle is disconnected.

5. The computer-implemented method of claim 1, wherein the method further comprises, based upon the health status of the communication connection indicating no issue with the communication connection with the autonomous vehicle, querying current telematics data from the autonomous vehicle over the communication connection with the autonomous vehicle.

6. The computer-implemented method of claim 1, wherein the performing the plurality of checks to identify whether the error in the vehicle interface of the autonomous vehicle exists comprises verifying an error status corresponding to the vehicle interface of the autonomous vehicle.

7. The computer-implemented method of claim 1, wherein the performing the plurality of checks to identify whether the error in the vehicle interface of the autonomous vehicle exists comprises verifying whether stalling of the autonomous vehicle is related to a power supply or an alternator of the autonomous vehicle.

8. The computer-implemented method of claim 1, wherein the method further comprises performing the plurality of checks on a power supply of the autonomous vehicle, and an alternator of the autonomous vehicle.

9. A computer-implemented method, comprising:

establishing a communication link between a computing device of a service vehicle and an autonomous vehicle being rescued by attaching an electrical cable between an electrical interface of the service vehicle and an electrical interface of the autonomous vehicle;

verifying, from the computing device of the service vehicle, an operational status of a power supply of the autonomous vehicle;

powering the autonomous vehicle on based upon the operational status of the power supply of the autonomous vehicle;

performing, by the computing device of the service vehicle, a handshake operation with the autonomous vehicle;

executing, by the computing device of the service vehicle, a plurality of commands based upon successfully performing the handshake operation; and initiating rescue of the autonomous vehicle using the service vehicle based upon a successful execution of the plurality of commands, wherein an application server includes at least one processor in communication with at least one memory device, the at least one processor programmed to:

receive, at the application server from the autonomous vehicle, telematics data;

based upon analysis of the received telematics data, determine, by the application server, that the autonomous vehicle needs to be rescued;

verify, by the application server, a health status of a communication connection with the autonomous vehicle;

based upon the health status of the communication connection with the autonomous vehicle, perform, by the application server, a plurality of checks to identify whether an error in the electrical interface of the autonomous vehicle exists, the error in the electrical interface preventing the autonomous vehicle from receiving control commands to operate the autonomous vehicle; and based upon the plurality of checks indicating no error in the electrical interface, dispatch the service vehicle to a location of the autonomous vehicle to rescue the autonomous vehicle, wherein the service vehicle is configured to perform assessment of the autonomous vehicle by sending the control commands to the autonomous vehicle through the electrical interface.

10. The computer-implemented method of claim 9, wherein the electrical cable comprises power connections and data connections.

11. The computer-implemented method of claim 9, further comprising, upon verifying the operational status of the power supply of the autonomous vehicle indicating a failure in the power supply of the autonomous vehicle, powering the autonomous vehicle from an external power supply system of the service vehicle.

12. The computer-implemented method of claim 9, further comprising, upon verifying the operational status of the power supply of the autonomous vehicle indicating a failure in the power supply of the autonomous vehicle, or upon failure in successfully performing the handshake operation, requesting to dispatch a tow truck to a location of the autonomous vehicle being rescued.

13. The computer-implemented method of claim 9, further comprising, upon failure in successfully executing the commands, requesting to dispatch a service vehicle to a location of the autonomous vehicle being rescued.

14. The computer-implemented method of claim 9, wherein the commands include commands to perform one or more of:

verifying proper steering of the autonomous vehicle using a user interface of the computing device;

verifying proper acceleration or deceleration of the autonomous vehicle;

verifying proper functioning of signaling lights, headlights, or hazard lights;

verifying proper brake release of a trailer; or verifying proper functioning of a compressor of the autonomous vehicle.

* * * * *